United States Patent
Saunders (10) Patent No.: US 11,853,479 B2
(45) Date of Patent: Dec. 26, 2023

(54) HAPTIC GARMENT

(71) Applicant: Jonah B Saunders, Needham, MA (US)

(72) Inventor: Jonah B Saunders, Needham, MA (US)

(*) Notice: Subject to any disclaimer, the term of this patent is extended or adjusted under 35 U.S.C. 154(b) by 246 days.

(21) Appl. No.: 17/002,656

(22) Filed: Aug. 25, 2020

(65) Prior Publication Data
US 2021/0081046 A1    Mar. 18, 2021

Related U.S. Application Data
(60) Provisional application No. 62/900,697, filed on Sep. 16, 2019.

(51) Int. Cl.
| | | |
|---|---|---|
| *G06F 3/01* | (2006.01) |
| *A63F 13/285* | (2014.01) |
| *A41D 1/04* | (2006.01) |
| *A41D 1/02* | (2006.01) |
| *A41D 1/00* | (2018.01) |
| *H04L 69/18* | (2022.01) |
| *H04L 67/131* | (2022.01) |

(52) U.S. Cl.
CPC .......... *G06F 3/016* (2013.01); *A41D 1/002* (2013.01); *A41D 1/02* (2013.01); *A41D 1/04* (2013.01); *A63F 13/285* (2014.09); *G06F 3/011* (2013.01); *H04L 67/131* (2022.05); *H04L 69/18* (2013.01)

(58) Field of Classification Search
CPC .... G06F 3/016; G06F 3/011; G06F 2203/013; A41D 1/002; A41D 1/02; A41D 1/04; A63F 13/285; A63F 13/212; A63F 13/98; H04L 67/131; H04L 69/18
USPC ............................................ 340/407.1, 407.2
See application file for complete search history.

(56) References Cited

U.S. PATENT DOCUMENTS

| | | | |
|---|---|---|---|
| 8,046,408 B2 * | 10/2011 | Torabi .................... | G06F 3/011 709/204 |
| 9,282,893 B2 | 3/2016 | Longinotti-Buitoni | |
| 10,580,267 B2 * | 3/2020 | Aghara .................... | G08B 6/00 |
| 2006/0005067 A1 * | 1/2006 | Llyod, Jr. ............ | G06F 11/3414 714/E11.193 |
| 2010/0066512 A1 * | 3/2010 | Rank .................... | A63F 13/5255 381/56 |
| 2016/0135696 A1 | 5/2016 | Cobbett et al. | |
| 2016/0175704 A1 * | 6/2016 | Venkatesan ............ | A63F 13/42 463/37 |
| 2017/0106277 A1 | 4/2017 | Perdigon Rodriguez et al. | |
| 2018/0233163 A1 * | 8/2018 | Eagleman ............... | G10L 21/16 |

(Continued)

FOREIGN PATENT DOCUMENTS

| | | | | |
|---|---|---|---|---|
| EP | 3093736 A1 * | 11/2016 | ............ | G06F 1/163 |
| WO | WO2004107831 | 12/2004 | | |

(Continued)

*Primary Examiner* — Quan Zhen Wang
*Assistant Examiner* — Mancil Littlejohn, Jr.

(57) ABSTRACT

A haptic garment has a body configured to couple with a subject, and an input on or in the body and configured to receive stimuli signals from a VR or AR system. The garment also has a port operatively coupled with the input to receive the stimuli signals. Preferably, the port is configured to removably couple a stimulus module. As known by those in the art, the stimulus module produces a physical stimulus as a function of the stimuli signals.

10 Claims, 5 Drawing Sheets

(56) References Cited

U.S. PATENT DOCUMENTS

2019/0087002 A1* 3/2019 Mani ...................... G06T 7/246
2019/0132948 A1* 5/2019 Longinotti-Buitoni ......................
                                                    D06P 1/5285

FOREIGN PATENT DOCUMENTS

WO    WO-2007022064 A1 *   2/2007   ......... A61H 23/0263
WO    WO-2015062579 A1 *   5/2015   ............. A61B 5/002

* cited by examiner

HAPTIC GARMENT

PRIORITY

This patent application claims priority from provisional U.S. patent application No. 62/900,697 filed Sep. 16, 2019 entitled, "MODULAR HAPTIC GARMENT," and naming Jonah Saunders as inventor, the disclosure of which is incorporated herein, in its entirety, by reference.

FIELD OF THE INVENTION

Illustrative embodiments of the generally relate to stimuli produced by computer systems and, more particularly, various embodiments of the invention relate to stimuli produced by virtual reality and/or augmented reality systems.

BACKGROUND OF THE INVENTION

Virtual reality and augmented reality are rapidly gaining acceptance into mainstream circles. To make the experience more realistic, those in the art have created tactile feedback devices, implemented as haptic garments, that enable the user to actually feel virtual objects in virtual space. The technology of haptic garments, however, has a number of shortcoming.

SUMMARY OF VARIOUS EMBODIMENTS

In accordance with one embodiment of the invention, a haptic garment has a body configured to couple with a subject, and an input on or in the body and configured to receive stimuli signals from a VR or AR system. The garment also has a port coupled with the body. Preferably, the port is configured to removably couple a stimulus module. As known by those in the art, the stimulus module produces a physical stimulus as a function of the stimuli signals.

The port may have a number of different means for removably coupling the stimulus module. For example, the port may have a separate or connected mechanical fastener to removably couple the stimulus module. The vest also may come with a plurality of stimulus modules that each has a module interface configured to couple with the port.

The haptic garment may be configured as any of a variety of different garment types. For example, the body may be in the form of a vest or jacket. Moreover, the haptic garment also may have a translator operatively coupled with the input. The translator is configured to translate a given stimulus signal encoded in two or more different VR or AR protocols to a standardized stimulus signal of a standardized haptic protocol.

In accordance with another embodiment, a haptic garment may have a body configured to couple with a subject (e.g., a human or non-human), an input on or in the body and configured to receive a stimulus signal from a VR or AR system, and a converter configured to receive the stimuli signals from the input. The garment also has a stimulus module configured to produce a physical stimulus as a function of the stimulus signal module having a prescribed specification. In that case, the converter is configured to produce a stimulus module signal as a function of the prescribed specification and the stimulus signal. The stimulus module responsively can produce the physical stimulus as a function of the stimulus module signal.

Preferably, the converter is configured to determine the requirements of the stimulus module and consequently produce the stimulus module signal as a function of the requirements. For example, with knowledge of the noted requirements, the converter may be configured to down-convert or up-convert the functionality of the stimulus module via the stimulus module signal.

As with other embodiments, the stimulus module may be removably couplable to the body. Moreover, the haptic garment also may have a translator operatively coupled with the input. The translator is configured to translate a given stimulus signal encoded in two or more different VR or AR protocols to a standardized stimulus signal of a standardized haptic protocol.

In accordance with other embodiments, a haptic garment has a body configured to couple with a subject, an input on or in the body and configured to receive stimuli from a VR or AR system, and a translator operatively coupled with the input. The translator is configured to translate a given stimulus signal encoded in two or more different VR or AR protocols to a standardized stimulus signal of a standardized haptic protocol. The garment also has a port for communicating with a stimulus module to receive the standardized stimulus signal and produce a physical stimulus as a function of the standardized stimulus signal.

This latter embodiment also may be removably couplable in a manner similar to above noted embodiments. In a similar manner, this latter embodiment also may have a converter that controls a stimulus module according to the prescribed specification of that stimulus module.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a virtual reality ("VR") system or augmented reality ("AR") system is configured to operate with a plurality of different proprietary VR and/or AR protocols. Another embodiments more flexibly enhance the utility of a haptic garment by having ports with removably couplable stimulation modules. Still further embodiments enable a haptic garment to intelligently adapt stimulus signals from the VR and/or AR system for use with stimulus modules with otherwise incompatible specifications. Details of illustrative embodiments are discussed below.

Figure 1:
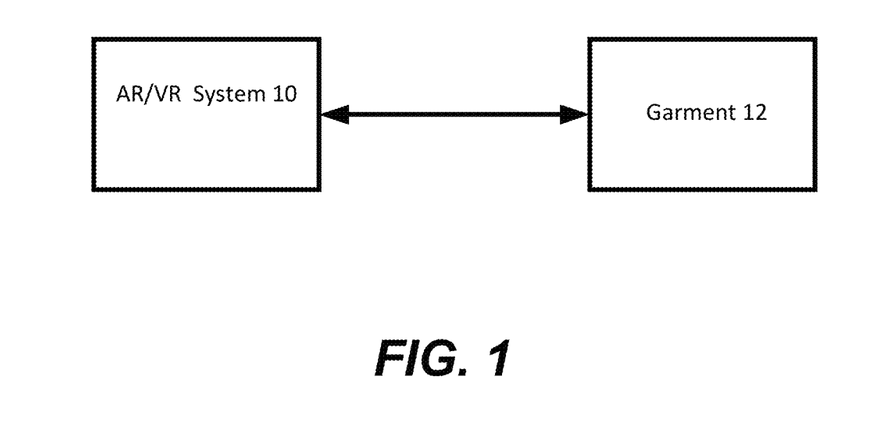
FIG. 1 schematically shows a virtual reality/augmented reality system and haptic garment that may be implemented in accordance with illustrative embodiments of the invention.

FIG. 1 schematically shows, in block diagram format, an AR or VR system that cooperates with a garment configured to be work by a user of the system. More specifically, as a user interacts with the AR/VR system 10, the AR/VR system 10 generates stimulation signals to the above noted haptic garment 12 (e.g., modules 16, discussed below, produce the haptic response). Receipt of those stimulation signals produces a tactile or actual physical reaction by modules 16, which are part of the garment 12. For example, the user may be interact with a VR game that simulates paintball. When another player in the VR game shoots a paintball at the user and virtually strikes the user's chest with a paintball, the VR/AR system produces a signal that, when received by the garment 12, causes an actuator on the garment 12 to produce some kind of tactile event that preferably can be felt by the user. This tactile event preferably simulates or at least provides feedback to the user that he/she was struck with the paintball. For example, a plunger may extend from a solenoid to lightly nudge the user.

In some embodiments, the garment 12 also may have sensors that, when actuated, send sense signals back to the VR/AR system. For example, an accelerometer in the arms of the garment 12 may sense movement, causing a corresponding movement in the VR/AR system. The sensors, as well as the actuators, can incorporate various embodiments of the invention, such as being removable, and/or being able to interact with many different proprietary standards. They also may be usable with different levels of performance (as discussed below).

The garment 12 can be any of a variety of different forms to fit on different parts of a user's body. For example, it can be a vest, jacket, pants, sleeve, shorts, shoes, hat, facemask, etc. In a similar manner, each individual module 16 could be for a different body part as noted above, or a plurality of modules 16 could be for a single body part or region of the body. For example, the modules 16 can be configured to be positioned near the foot, chest, hand, head, rear-end, legs, etc. Some modules 16 can be generic and mounted on any of a variety of different body parts. The garment 12 may be made from any of a variety of materials, such as nylon, cotton, or other material applicable for a given set of applications.

The modules 16 can include single modules 16, or modules-in-modules 16. As a module-in-module 16, a single module 16 could serve as the platform for multiple smaller modules 16 with like or different functionality. To that end, the module 16 may have a base portion that removably secures to the body 14 of the garment 12, while one or more other modules 16 can be removably secured to the base module 16, which itself may be permanently or removably secured to the garment body 14.

It should be noted that the term "AR/VR system 10" is shorthand and simply referring to a system that can implement AR, VR, or both AR and VR technologies. Moreover, the term, "VR system" simply means that the system implements VR but may not implement AR. In a similar manner, the term, "AR system" simply means that the system implements AR but may not implement VR.

Figure 2:
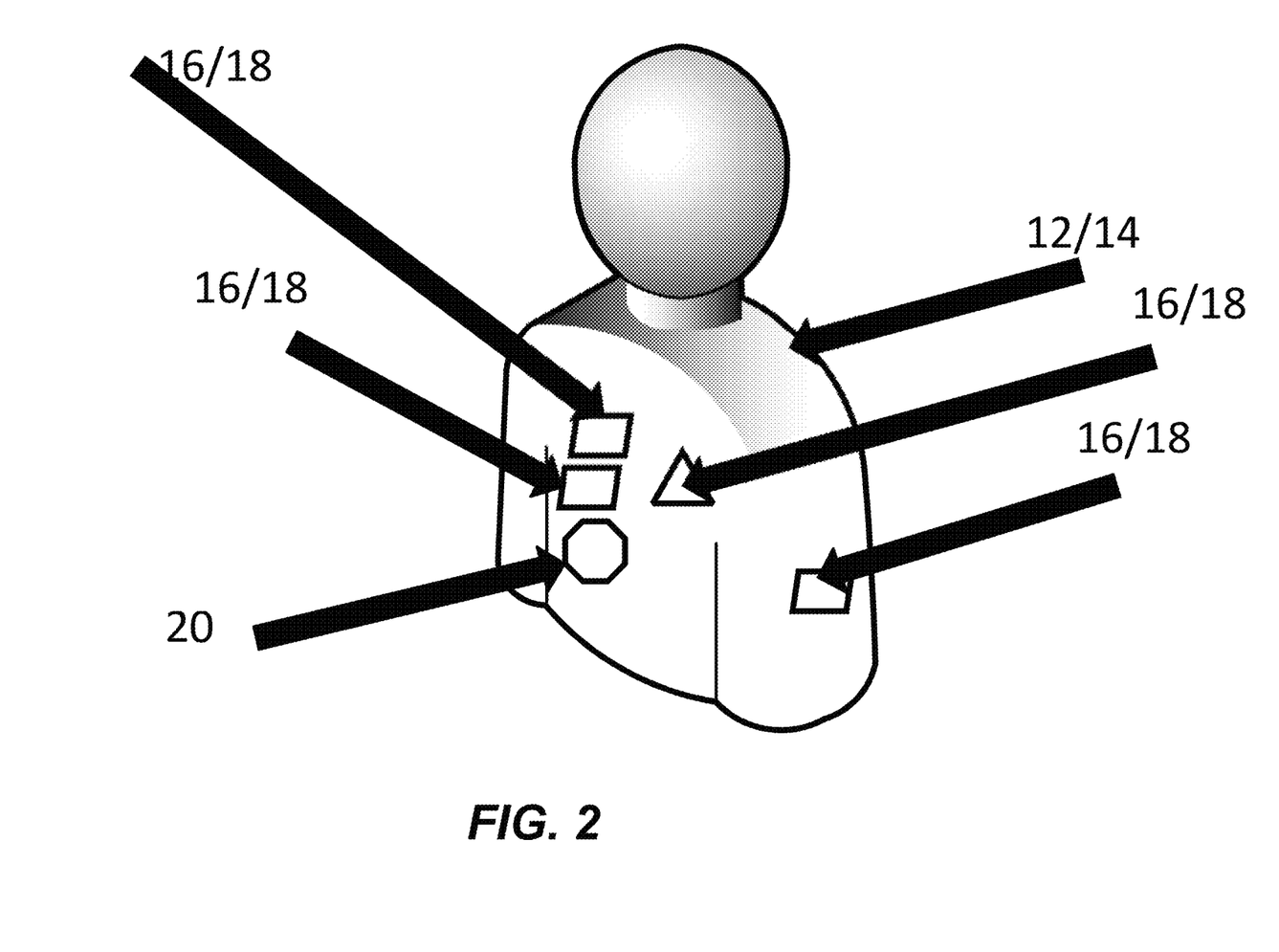
FIG. 2 schematically shows a haptic garment that may be implemented in accordance with illustrative embodiments of the invention.

FIG. 2 schematically shows the haptic garment 12 implemented in accordance with illustrative embodiments of the invention. The haptic garment 12 in this example is a haptic shirt and is shown as worn on a person. In particular, as shown, the garment 12 has a body 14 that supports a plurality of functional components. Among other things, the figure shows three stimulus modules 16 configured to produce tactile feedback for a user, as discussed above. In addition, this figure also shows a port 18 configured to couple with one or more stimulus modules 16.

In preferred embodiments, however, this port 18 is fixedly coupled with the body 14, and removably coupleable with one or more stimulus modules 16. Specifically, the port 18 should be constructed and configured so that a stimulus module 16 can be physically secured to the port 18 and removably connected multiple times without significant structural damage, such as cutting the body 14 or breaking the port 18 or stimulus module 16. When coupled, the port 18 permits the stimulus module 16 to communicate with other electronic devices, discussed below. In some embodiments, the port 18 conductively communicates with the stimulus module 16 and other functional components to transmit electronic signals. In other embodiments, however, the port 18 serves no electrical function and thus, simply couples the stimulus module 16 with the body 14.

A number of different technologies can removably couple/removably secure the stimulus modules 16 to the ports 18. In fact, some embodiments may use multiple removably connectable modalities, or modalities that are not part of the port 18 or the stimulus modules 16. Among other things, some embodiments use bands strapped around a user's body. These bands would lock the stimulus module 16 in place and in a manner that ensures the are not moved/ruined by movement. Another embodiment may use a combination of pockets and/or Velcro. Yet other embodiments may use mechanical fasteners, screws, snap-fit technologies (e.g., snap-fit buttons), interference-fit technologies, other types of buttons, and/or magnetic technologies.

In addition to supporting at least one port 18, which correspondingly supports at least one stimulus module 16, the garment 12 also may include on-body or off-body management logic 20 configured to process incoming and outgoing signals to/from the garment 12. FIG. 2 schematically shows this management logic 20 integrated into and/or supported by the body 14, while other embodiments may have this management logic 20 remote from the garment 12 (e.g., part of the AR/VR system 10 or a third component not shown in FIG. 1).

Some embodiments may involve a singular removable module with additional capabilities that are more easily integrated. Among other things, the removable modules might include vibration motors, heating pads, solenoids, acoustic device (e.g., a speaker) emitting acoustic signals that can be felt by the user, liquid filled reservoirs, and/or some other sort of electronic device. Each module preferably is relatively inexpensive (e.g., $25-$50). An exemplary basic stimulus module 16 set might include a stimulus module 16 for the chest and two arms. Finding games to support the VR haptics might be a little bit harder—if a basic haptic plugin were included, that would easily allow developers to add to the vest. Illustrative embodiments generate the haptics based on sound through some sort of deep learning programming or other artificial intelligence platform.

Figure 3:
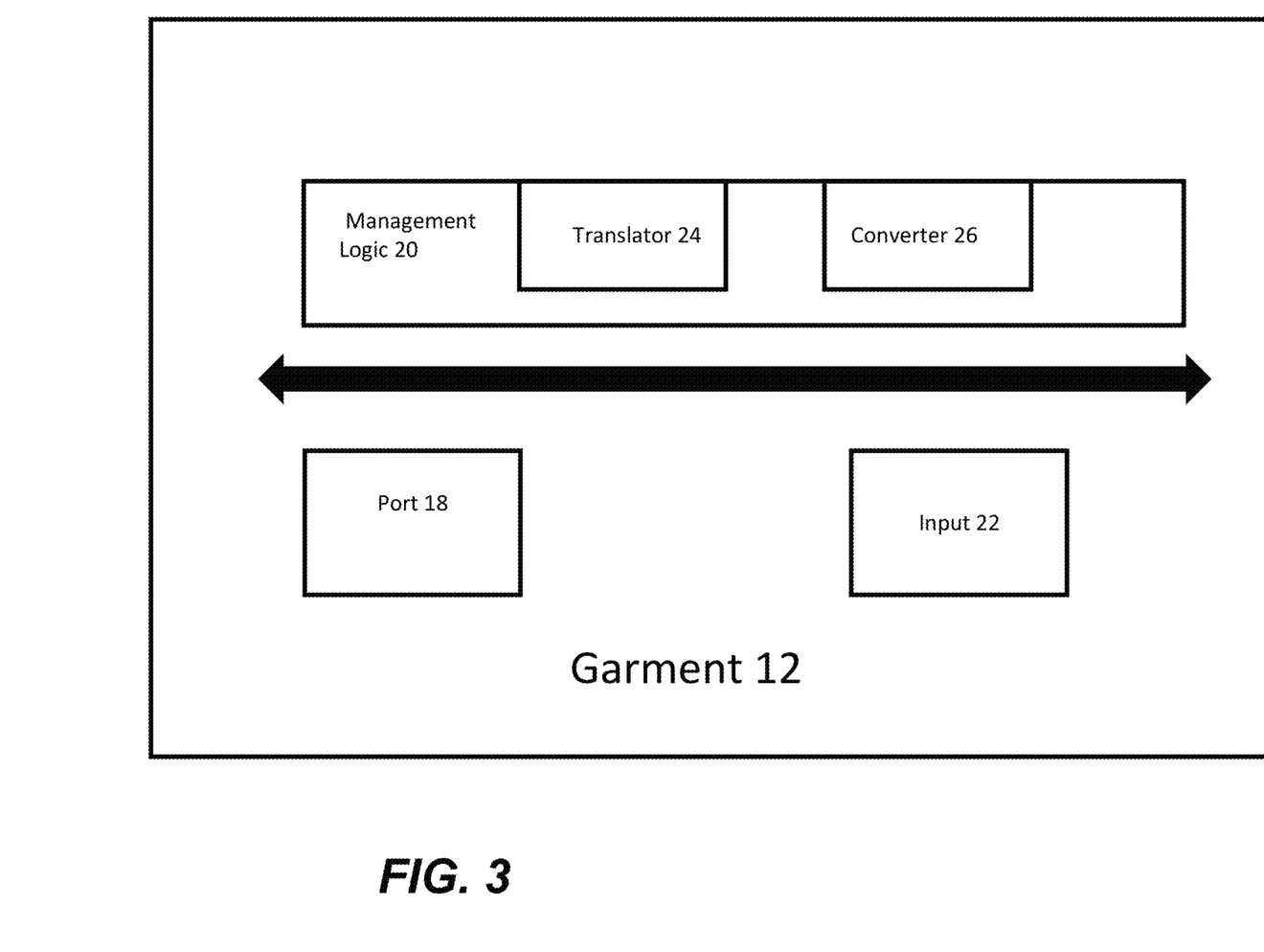
FIG. 3 schematically shows details of various functional components of the haptic garment of FIG. 2 in accordance with illustrative embodiments of the invention.

FIG. 3 schematically shows details of various functional components of the haptic garment 12 of FIG. 2 in accordance with illustrative embodiments of the invention. Each of these components is operatively connected by any conventional interconnect mechanism. FIG. 3 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 3 only schematically shows each of these components. Those skilled in the art should understand that each of these components can be implemented in a variety of conventional manners, such as by using hardware, software, or a combination of hardware and software, across one or more other functional components. For example, the management logic 20 may be implemented using a plurality of microprocessors executing firmware. As another example, the management logic 20 may be implemented using one or more application specific integrated circuits (i.e., "ASICs") and related software, or a combination of ASICs, discrete electronic components (e.g., transistors), and microprocessors. Accordingly, the representation of the management logic 20 and other components in a single box of FIG. 3 is for simplicity purposes only. In fact, in some embodiments, the management logic 20 of FIG. 3 is distributed across a plurality of different components and/or machines—not necessarily within the same package or housing.

It should be reiterated that the representation of FIG. 3 is a significantly simplified representation of an actual garment 12 (e.g., it does not show the body 14). Those skilled in the art should understand that such a device has many other physical and functional components. Accordingly, this discussion is in no way intended to suggest that FIG. 3 represents all of the elements of the garment 12.

As shown, the garment 12 has the noted port 18, and an input 22 to receive and transmit signals to/from the AR/VR system 10. This input 22 may be separate from the port 18 and management logic 20, or integrated into one or both of them. This figure shows more information about the management logic 20, which also includes a translator 24 to translate a command/message between two different protocols, and a converter 26 to convert a command/message to the appropriate requirement of a given stimulus module 16. Each of these devices is discussed in greater detail below with regard to FIGS. 4 and 5.

Figure 4:
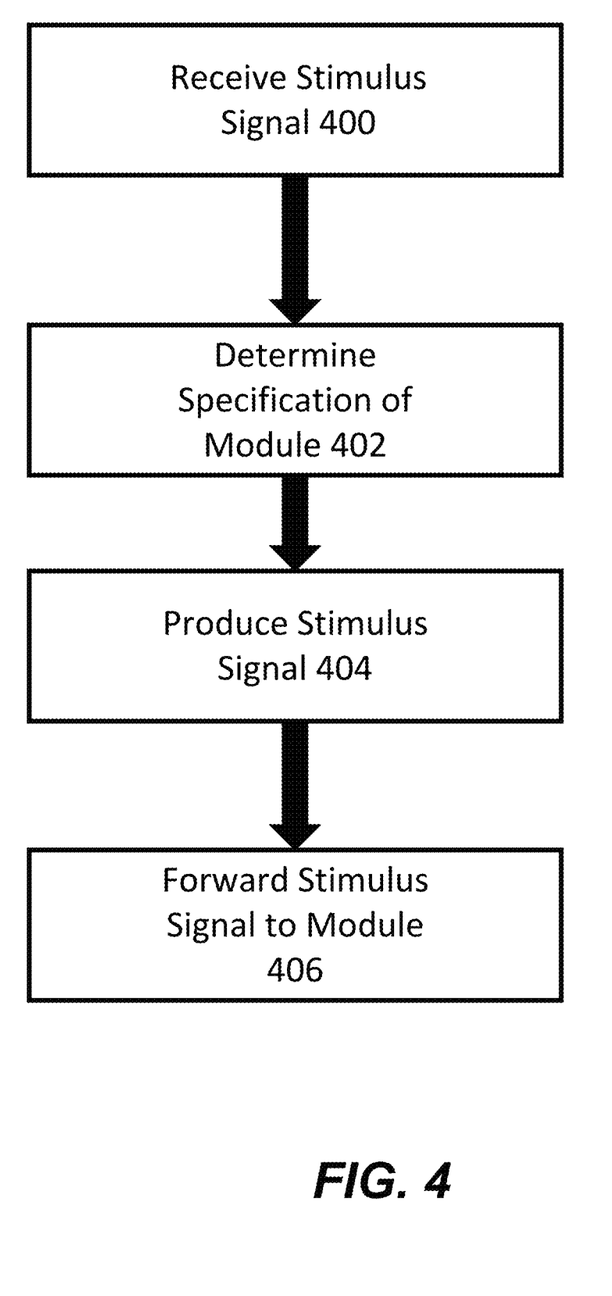
FIG. 4 schematically shows a first process of managing haptic signals in accordance with illustrative embodiments of the invention.

FIG. 4 shows a process of managing haptic signals in accordance with illustrative embodiments of the invention. More specifically, this process uses the converter 26 to convert a received stimulus signal, from the AR/VR system 10, into a revised stimulus signal as a function of the requirements/limitations/features of the stimulus module 16 intended to receive the stimulus signal. It should be noted that this process is substantially simplified from a longer process that normally would be used to convert a stimulus signal.

Accordingly, the process may have additional steps that those skilled in the art likely would use. In addition, some of the steps may be performed in a different order than that shown, or at the same time. Those skilled in the art therefore can modify the process as appropriate. Moreover, some of the hardware and/or software structures noted are but one of a wide variety of different structures that may be used. Those skilled in the art can select the appropriate structures depending upon the application and other constraints. Accordingly, discussion of specific structures is not intended to limit all embodiments.

The process begins at step 400, when the management logic 20 receives a stimulus signal from the AR/VR system 10 via the input 22. Next, at step 402, the process determines the prescribed specification of the stimulus module 16 intended to receive the stimulus signal. Specifically, the stimulus signal, produced by the AR/VR system 10, has information relating to a specific type of stimulus module 16. That information indicates certain specifications of the stimulus module 16 it targets. Those specifications may include the granularity of a tactile signal the stimulus module 16 may produce, the type of tactile signal, and other abilities of the stimulus module 16 as dictated by the application.

For example, while using the AR/VR system 10, a virtual person may virtually grab the arm of the user (producing a virtual stimulus). The AR/VR system 10 responsively may determine specifics of that virtual grab (e.g., how many fingers contacted the user's arm, how much pressure was applied, etc.). The AR/VR system 10 then may convert that information into a standard stimulus signal with some or all that information—regardless of the specification/capabilities/requirements of the stimulus module 16.

The converter 26 thus receives that stimulus signal (step 404) and, if necessary, produces a new stimulus signal or a modified stimulus signal (also referred to as a "stimulus module signal") with information specific to the capabilities of the target stimulus module 16. To that end, the converter 26 has access to memory (e.g., a rapidly accessible cache) that is indexed with relevant specifications of a plurality of different types of stimulus modules 16. As such, using some accessing algorithm, such as an indexing process, the converter 26 locates the stored information, preferably in real-time, and then processes the stimulus message.

Continuing with the above example, the stimulus module 16 may be inexpensive and with limited capabilities. In that case, it may not have granular or multiple actuators to represent a different pressure for each finger. In that case, a generalized stimulus signal may simply have stimulus information with a single pressure across a prescribed region of the arm. Conversely, if the stimulus module 16 is expensive and has the capability to sense each finger, the converter 26 may pass the stimulus signal with no change (since it already has the necessary information) or, if necessary, modify the stimulus signal and/or produce a new stimulus signal with the required stimulus information.

The process concludes at step 406, which forwards the stimulus signal, whether it is modified, new or the same one received by the converter 26, to the stimulus module 16.

It should be noted that some embodiments with a port 18 that conductively couples with the stimulus module 16 may have some logic embedded into it, or simply be a "dumb" interface to electrically transmit the information directly to the stimulus module 16. In either case, the stimulus module 16 preferably has mating interfaces that align with corresponding interface(s) of the port 18 to make the electrical connection. Various embodiments that do not have electrically conductive ports 18, however, may simply have a conductive channel that couples directly with the stimulus module 16.

The converter 26 thus enables the garment 12 to use any of a variety of different types of stimulus modules 16 without concern for precisely matching a specification. Accordingly, a given virtual stimulus may produce any of a variety of different tactile stimuli, depending on the stimulus module 16 mounted to the body 14. This opens up the use to a wider variety of types of stimulus modules 16 that may be used for a given haptic garment 12.

Some embodiments may pair a set of stimulus modules 16 with a given garment 12. For example, the set of stimulus modules 16 may include a heat is stimulus module 16 and a pressure stimulus module 16. In fact, within each type of stimulus module 16, the set may have multiple times with different specifications/capabilities.

Figure 5:
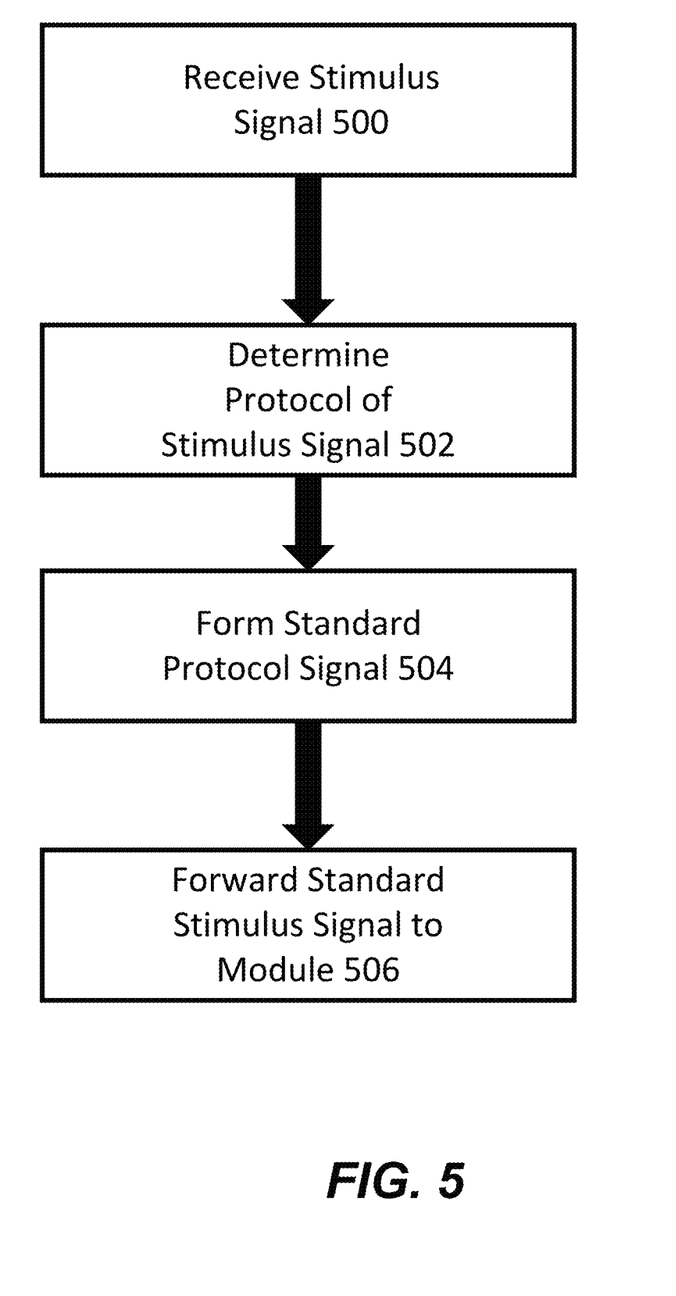
FIG. 5 schematically shows a second process of managing haptic signals in accordance with illustrative embodiments of the invention.

FIG. 5 shows a process of managing haptic signals in accordance with illustrative embodiments of the invention. More specifically, this process uses the translator 24 to convert a received stimulus signal, from the AR/VR system 10, into a transport/transmission protocol that can be read/used by the target stimulus module 16. It should be noted that, like the process of FIG. 4, this process is substantially simplified from a longer process that normally would be used to modify the protocol.

Accordingly, the process may have additional steps that those skilled in the art likely would use. In addition, some of the steps may be performed in a different order than that shown, or at the same time. Those skilled in the art therefore can modify the process as appropriate. Moreover, some of the hardware and/or software structures noted are but one of a wide variety of different structures that may be used. Those skilled in the art can select the appropriate structures depending upon the application and other constraints. Accordingly, discussion of specific structures is not intended to limit all embodiments.

The process begins at step 500, when the management logic 20 receives a stimulus signal from the AR/VR system 10 via the input 22. Next, at step 502, the process determines the protocol of the stimulus module 16 intended to receive the stimulus signal. Specifically, the stimulus signal, produced by the AR/VR system 10, was transmitted using a specific protocol (e.g., a proprietary protocol) intended to be received and processed by the target stimulus module 16. Undesirably, prior art AR/VR system 10s known by the inventor are not configured to communicate with a wide variety of stimulus modules 16. Instead, such AR/VR system 10s typically transmit and format their messages using a specific transport/transmission protocol that is used by the target stimulus module 16. Accordingly, if the target stimulus module 16 cannot understand that protocol, it is not functional.

The translator 24 therefore preferably has information in some memory (e.g., rapidly accessible cache or other memory) relating to two or more proprietary protocols used by a corresponding plurality of specific types of stimulus modules 16. That information should be readily accessible by any of a plurality of known techniques, such as by using an indexing technique. As with the process of FIG. 4, the translator 24 also has knowledge of the target stimulus module 16, such as by analyzing the stimulus signal or some other means.

For example, a pressure stimulus module 16 produced by Company A may use Protocol A, while a pressure stimulus module 16 produced by Company B may use Protocol B. Accordingly, in the prior art discussed above, the pressure sensor of Company B cannot read a stimulus signal formatted using Protocol A—it needs Protocol B. At step 502, the translator 24 accesses its memory to determine the protocol and determines the protocol of the stimulus signal it receives. Among other ways, the translator 24 may parse or otherwise analyze metadata and/or header data in the stimulus signal to determine the protocol.

The translator 24 also has information stored in memory relating to the protocol required by the target stimulus module 16. Accordingly, at step 504, the translator 24 forms a standard protocol stimulus signal that can be read by the target stimulus module 16. In some embodiments, this new signal is in the format of the target stimulus module 16. Alternatively, if the stimulus module 16 itself can access a "standard" protocol that is accessible by a number of different stimulus modules 16 of different manufacturers or different protocols, then the translator 24 may form the new stimulus signal with this different type of standard protocol.

The process concludes at step 506, which forwards the standard stimulus signal to the target stimulus module 16. Continuing with the above example, if the stimulus module 16 is produced by Company B, but the AR/VR system 10 produced the initial stimulus signal using Protocol A, then the translator 24 detects that the initial stimulus signal uses Protocol A, determines that the target uses Protocol B, and produces the standard stimulus signal using Protocol B.

This process therefore further enables use of any of a variety of different stimulus modules 16 from disparate manufacturers using different protocols. This flexibility, like that provided by the process of FIG. 4, provides significant flexibility for manufacture of the tactile garment 12, as well as when using removably connectable stimulus modules 16.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A haptic garment comprising:
a body configured to couple with a subject;

an input supported on or in the body and configured to receive stimuli signals from a virtual reality or augmented reality system;

management logic configured to process incoming and outgoing signals to or from the body;

a port coupled with the body, the port being configured to removably couple a stimulus module, the stimulus module producing a physical stimulus as a function of the stimuli signals, the module comprising a module-in-module having a base portion that removably secures to the body, the module-in-module further having a plurality of other modules removably couplable to the base portion, the management logic configured to process incoming and outgoing signals to or from the module-in-module; and a converter configured to receive the stimulus signals from the input, the converter determining a prescribed specification of the module, the converter configured to produce a tactile stimulus module signal as a function of the prescribed specification and the stimulus signal, the stimulus module producing the physical stimulus as a function of the stimulus module signal, wherein the converter is configured to down-convert the granularity of the stimulus module signal to produce a down-converted physical stimulus with a lower granularity than the capability of the stimulus module signal before down-conversion.

2. The haptic garment of claim 1 wherein the port comprises a mechanical fastener to removably couple the stimulus module.

3. The haptic garment of claim 1 further comprising a plurality of stimulus modules, each module having a module interface configured to couple with the port.

4. The haptic garment of claim 1 wherein the body comprises a vest or a jacket.

5. The haptic garment of claim 1 further comprising a translator operatively coupled with the input, the translator configured to translate a given stimulus signal encoded in two or more different virtual reality or augmented reality protocols to a standardized stimulus signal of a standardized haptic protocol.

6. A haptic garment comprising:

a body configured to couple with a subject;

an input on or in the body and configured to receive a tactile stimulus signal from a virtual reality or augmented reality system;

a converter configured to receive the tactile stimulus signal from the input;

a stimulus module configured to produce a physical stimulus as a function of the tactile stimulus signal, the stimulus module having a prescribed specification, the converter determining the prescribed specification of the stimulus module;

the converter configured to produce a tactile stimulus module signal as a function of the prescribed specification and the tactile stimulus signal, the stimulus module producing the physical stimulus as a function of the tactile stimulus module signal, wherein the converter is configured to down-convert the granularity of the tactile stimulus module signal to produce a down-converted physical stimulus.

7. The haptic garment of claim 6 wherein the stimulus module is removably couplable to the body.

8. The haptic garment of claim 6 further comprising a translator operatively coupled with the input, the translator configured to translate a given stimulus signal encoded in two or more different virtual reality protocols to a standardized stimulus signal of a standardized haptic protocol.

9. The haptic garment of claim 6 wherein the body comprises a vest.

10. The haptic garment of claim 6 wherein the body comprises a jacket.

\* \* \* \* \*